United States Patent Office 3,737,537
Patented June 5, 1973

3,737,537
SYNERGISTIC MIXTURE OF DRUGS
Jack Hayden, 91 Dewent Drive, Maidenhead, England, and William Stewart Ogden, The Tithing, Copthall Lane, Chalfont St. Peter, England
No Drawing. Continuation-in-part of abandoned application Ser. No. 745,969, July 19, 1968. This application June 8, 1971, Ser. No. 151,144
Claims priority, application Great Britain, July 25, 1967, 34,124/67
Int. Cl. A61k 27/00
U.S. Cl. 424—247      8 Claims

ABSTRACT OF THE DISCLOSURE

Synergistic mixtures of 3-methylpent-1-yn-3-ol carbamate and promethazine in a ratio by weight of carbamate to promethazine of between 4:1 and 16:1 are useful as hypnotics.

CROSS REFERENCE TO RELATED APPLICATIONS

This application is a continuation-in-part of copending application Ser. No. 745,969 filed July 19, 1968, and now abandoned. This application relies upon the priority claimed in Ser. No. 745,969 of July 25, 1967 in Great Britain, No. 34,124/67.

This invention relates to pharmaceutical compositions having hypnotic activity and to methods of inducing hypnosis.

More particularly the instant invention is concerned with providing synergistic mixtures of 3-methylpent-1-yn-3-ol carbamate and promethazine, which may be in the form of one of its pharmaceutically acceptable salts.

Salts of promethazine are particularly acid addition salts such as those with inorganic acids for example hydrochloric, hydrobromic, nitric, sulphuric or phosphoric acids, or with organic acids, such as organic carboxylic acids, for example acetic, glycollic, maleic, hydroxymaleic, malic, tartaric, citric, salicylic, o-acetyloxybenzoic, nicotinic or isonicotinic acids, or organic sulphonic acids, for example methane sulphonic, ethane sulphonic, 2-hydroxyethane sulphonic, p-toluene sulphonic or naphthalene 2-sulphonic acid.

The compounds of the mixture of the instant invention have long been known to be useful drugs, being used as transquillisers and, in the case of promethazine, also as an antihistamine. Although both the carbamate and the promethazine alone can produce a hypnotic effect, a useful hypnotic effect is only achieved at dosages approaching the maximum safe dose.

It has now surprisingly been found that the combination of 3-methylpent-1-yn-3-ol carbamate and promethazine in a suitable ratio by weight produces a powerful hypnotic effect of an order substantially greater than that which might have been expected from summation of their individual hypnotic effects.

Accordingly the instant invention provides a hypnotic drug comprising 3-methylpent-1-yn-3-ol carbamate and promethazine, preferably in the form of its hydrochloride, in a ratio by weight of from 4:1 to 16:1, and preferably a pharmaceutically acceptable carrier therefor. Advantageously the weight ratio is from 4:1 to 8:1.

Although it is desirable to administer the active compounds together, the required hypnotic effect can also be achieved by administering the active ingredients simultaneously by the same or different routes. Thus, for example, the compounds of the mixture may be formulated in two separate tablets to be taken orally or a capsule containing the required dose of the carbamate may be administered orally whilst promethazine is given by injection.

The instant invention also provides a method of inducing hypnosis comprising administering simultaneously to an animal, including a human, subject an effective dose of 3-methylpent-1-yn-3-ol carbamate and an effective dose of promethazine the ratio by weight of the dose of the carbamate to the dose of promethazine being from 4:1 to 16:1.

The compounds or compositions of the instant invention are preferably administered orally, rectally or parenterally in the form of, for example, tablets, capsules, suppositories, suspensions or solutions. Advantageously for this purpose, formulations may be provided in dosage unit form. Each dosage unit preferably contains from 50 to 500 mg. of the carbamate, and most advantageously 75 to 250 mg. Similarly each dosage unit preferably contains from 1 to 400 mg. of the promethazine, more preferably 4 to 250 mg. and most advantageously 5 to 110 mg. Preferably the total weight of both components does not exceed 650 mg.

The term "dosage unit" is used herein as meaning a physically discrete unit containing an individual quantity of the active ingredient in admixture with a pharmaceutical diluent therefor or otherwise in association with a pharmaceutical carrier, the quantity of the active ingredient being such that one or more units are normally required for a single therapeutic administration or that, in the case of severable units such as scored tablets, at least one fraction such as a half or a quarter of a severable unit is required for a single therapeutic administration.

The compositions of the instant invention will normally consist of the active ingredient or ingredients mixed with a carrier, or diluted by a carrier, or enclosed or encapsulated by a carrier in the form of a capsule, sachet, cachet, paper or other container. A carrier which serves as a vehicle, excipient or diluent for the active therapeutic ingredient may be a solid, semi-solid or liquid material.

Some examples of the carriers which may be employed in the pharmaceutical compositions of the invention are lactose, dextrose, sucrose, sorbitol, mannitol, starch, gum acacia, calcium phosphate, liquid paraffin, cocoa butter, oil of theobroma, alginates, tragacanth, gelatin, syrup B.P., methyl cellulose, sodium lauryl sulphate, polyoxyethylene sorbitan monolaurate, and methyl and propyl hydroxybenzoates.

As the active ingredients tend to interact and the carbamate is somewhat unstable at elevated temperatures, means are included in the compositions of the instant invention to prevent interaction between the active ingredients. Preferably the active ingredients are separated from each other and from the atmosphere. Thus the compounds may be formulated in a two-layer tablet or compartmental capsule, as individual tablets inserted into a capsule, and/or suitable coatings may be applied to the granules before being encapsulated, or prior to compression into tablets or to the finished tablets themselves. Such coatings may include, for example, ethyl cellulose acetate phthalate, low-viscosity high acetyl cellulose acetate, various waxes such as paraffin wax, mineral wax such as montan wax, vegetable wax such as carnauba wax, or an insect wax such as shellac wax, or the coating may be a vegetable gum, or even sugar. Such coatings may also contain an amount of a plasticiser such as dioctyl phthalate or diethylphthalate.

The following examples will further illustrate the present invention:

EXAMPLE 1

Tablets each containing the following ingredients were made.

| | Mg. per tablet |
|---|---|
| 3-methylpent-1-yn-3-ol carbamate | 150.00 |
| Lactose | 42.50 |
| Calcium phosphate | 36.65 |
| Alginic acid (1) | 5.00 |
| Gelatin | 5.00 |
| Alginic acid (11) | 2.50 |
| Maize starch | 7.75 |
| Magnesium stearate | 0.60 |
| | 250.00 |

The carbamate, lactose, calcium phosphate and alginic acid (1) were thoroughly mixed. The gelatin was added to cold deionised water and heated until dissolved. This solution was added to the mixture previously obtained and the resultant mixture was mixed until it was homogeneous. This mixture was passed through a ⅜ inch screen and then dried at 25° C. for eight hours. To the resultant dry granules, the alginic acid (11), maize starch and magnesium stearate were added. After mixing for five minutes, the granules were compressed into tablets each weighing 250 mg. If desired, the tablets may then be coated with a beeswax/carnauba wax mixture.

EXAMPLE 2

Tablets were prepared as in Example 1 except that 200 mg. of the carbamate was used.

EXAMPLE 3

Tablets were prepared as in Example 1 except that 250 mg. of the carbamate was used.

EXAMPLE 4

Tablets each containing the following ingredients were prepared.

| | Mg. per tablet |
|---|---|
| Promethazine hydrochloride | 75.00 |
| Lactose | 57.00 |
| Ethyl cellulose | 1.00 |
| Starch (1) | 40.00 |
| Starch (11) | 25.50 |
| Magnesium stearate | 1.50 |
| | 200.00 |

The promethazine hydrochloride, lactose and starch (1) were passed through a 40 mesh B.S.S. screen and then massed in a solution of the ethyl cellulose in industrial methylated spirit. The mass was granulated through a 10 mesh B.S.S. screen and the granules dried at 40° C. After drying, the granules were regranulated through a 16 mesh B.S.S. screen, mixed with the starch (11) and magnesium stearate (previously) sieved through 40 mesh and 60 mesh B.S.S. screens respectively) and compressed into tablets each containing 75 mg. of promethazine. The tablets were then sugar coated.

EXAMPLE 5

Tablets were prepared as in Example 4 except that 50 mg. promethazine hydrochloride was used.

EXAMPLE 6

Tablets were prepared as in Example 4 except that 25 mg. promethazine hydrochloride was used.

EXAMPLE 7

An injection solution containing the following ingredients was prepared.

| | Mg. |
|---|---|
| Promethazine hydrochloride | 25 |
| Sodium metabisulphite | 1 |
| Water for injection (free from dissolved air) to | 1 |

The promethazine hydrochloride and sodium metabisulphite were dissolved in the water for injeciton from which the air had been removed by boiling for 15 minutes and then cooling under nitrogen. The solution was clarified by passing through a No. 3 sintered glass filter and was then filled into 2 ml. ampoules. The latter were then sterilised by heating in an autoclave.

It was found that the concomitant administration of a first formulation selected from Examples 1 to 3 and a second formulation selected from Examples 4 to 7, the ratio of active ingredient in the first formulation to active ingredient in the second formulation being chosen so as to be between 4:1 and 12:1, to patients suffering from insomnia produced a sound sleep from which the patient awoke without any "hang-over" effect.

EXAMPLE 8

Tablets each containing the following ingredients were made.

| | Mg. per tablet |
|---|---|
| (1) 3-methylpent-1-yn-3-ol carbamate | 175.00 |
| (2) Lactose (1) | 20.75 |
| (3) Starch (1) | 20.00 |
| (4) Alginic acid (1) | 5.00 |
| (5) Gelatin | 10.00 |
| (6) Promethazine hydrochloride | 25.00 |
| (7) Lactose (11) | 55.00 |
| (8) Ethyl cellulose | 0.90 |
| (9) Starch (11) | 40.00 |
| (10) Alginic acid (11) | 2.15 |
| (11) Starch (111) | 29.35 |
| (12) Magnesium stearate | 1.85 |
| | 385.00 |

(A) A solution of the gelatin in distilled water was prepared and used to mass ingredients 1 to 4, all of which has been previously sieved through a 40 mesh B.S.S. screen. The mass was granulated by passing through a 10 mesh B.S.S. screen and the granules dried at 25° C. After drying, the granules were regranulated through a 16 mesh B.S.S. screen.

(B) A solution of the ethyl cellulose in industrial methylated spirit was used to mass the ingredients 6, 7 and 9, B.S.S. screen and the granules dried at 40° C. After drying, the granules were regranulated through a 16 mesh B.S.S. screen.

(C) The granules from A and B were mixed, the in-all of which had previously sieved through a 40 mesh B.S.S. screen, and ingredient 12, previously sieved through a 60 mesh B.S.S. screen, were added and the whole thoroughly mixed. The resultant granules were then compressed into tablets weighing 385 mg.

The administration of one or two of the above tablets, depending on the patient's degree of insomnia, produced a sound and deep sleep from which the patient awoke without any of the "hang-over" effect such as that obtained after taking most barbiturate hypnotics.

EXAMPLE 9

Tablets were prepared as in Example 8 except that 200 mg. of the carbamate was used.

EXAMPLE 10

Tablets were prepared as in Example 9 except that 40 mg. of promethazine hydrochloride was used.

EXAMPLE 11

Capsules each containing the following ingredients were prepared.

|   | Mg. per capsule |
|---|---|
| 3-methylpent-1-yn-3-ol carbamate | 175.00 |
| Promethazine hydrochloride | 25.00 |
| Aerosil | 0.50 |
| Magnesium stearate | 1.50 |
|   | 202.00 |

The carbamate was sieved through a 40 mesh B.S.S. screen. The promethazine hydrochloride was triturated with the Aerosil. The ingredients were then mixed together, the magnesium stearate added and the mixture filled into hard gelatin capsules.

EXAMPLE 12

Capsules were prepared as in Example 11 except that 200 mg. of the carbamate was used.

EXAMPLE 13

Capsules were prepared as in Example 11 except that 150 mg. of the carbamate was used.

EXAMPLE 14

Cachets each containing the following ingredients were prepared.

|   | Mg. per cachet |
|---|---|
| 3-methylpent-1-yn-3-ol carbamate | 200.00 |
| Promethazine hydrochloride | 25.00 |
| Aerosil | 0.50 |
| Lactose | 274.50 |
|   | 500.00 |

The carbamate and lactose were sieved through a 40 mesh B.S.S. screen and then mixed. The Aerosil and promethazine hydrochloride were triturated together. The two powders were then mixed together and filled into cachets.

EXAMPLE 15

Suppositories each containing the following ingredients were made.

|   | Mg. |
|---|---|
| Promethazine hydrochloride | 25 |
| 3-methylpent-1-yn-3-ol carbamate | 175 |
| Oil of theobroma | 800 |

The promethazine hydrochloride and the carbamate were milled separately and then triturated with molten oil of theobroma at 40° C. to form a smooth suspension. The mixture was well stirred and then poured into moulds each of a nominal 1 g. capacity to produce suppositories.

EXAMPLE 16

Two-layered tablets containing the following ingredients were made:

|   | Mg. per tablet |
|---|---|
| (1) 3-methylpent-1-yn-3-ol carbamate | 175.00 |
| (2) Lactose | 39.40 |
| (3) Calcium phosphate | 39.55 |
| (4) Alginic acid | 17.50 |
| (5) Starch | 17.50 |
| (6) Gelatin | 8.75 |
| (7) Alginic acid | 26.25 |
| (8) Starch | 26.44 |
| (9) Magnesium stearate | 0.61 |
| (10) Promethazine hydrochloride | 25.00 |
| (11) Lactose | 200.00 |
| (12) Starch | 30.00 |
| (13) Ethyl cellulose | 2.00 |
| (14) Microcrystalline cellulose | 10.00 |
| (15) Starch | 10.20 |
| (16) Microcrystalline cellulose | 10.00 |
| (17) Magnesium stearate | 1.80 |
|   | 640.00 |

The powders 1 to 5 were passed through a 40 mesh B.S.S. screen. The gelatin 6 was dissolved in 350 ml. of warm distilled water and the sieved powders 1 to 5 massed by mixing with the gelatin solution. The mass was then granulated and the granules dried at below 30° C. the granules were regranulated through a 20 mesh B.S.S. screen and the powders 7 and 8 (sieved through a 40 mesh B.S.S. screen) and the magnesium stearate 9 (sieved through a 60 mesh screen) added and mixed thoroughly to produce Granules A containing 3-methylpentyl-1-yn-3-ol carbamate.

The powders 10, 11, 12 and 14 were passed through a 40 mesh B.S.S. screen. A 2.5% solution of the ethyl cellulose 13 in industrial methylated spirit was prepared and the sieved powders 10, 11 and 14 were massed by mixing with this solution. The mass was granulated and dried at 40° C. The dried granules were regranulated through a 16 mesh B.S.S. screen and the powders 15 and 16 (sieved through a 40 mesh B.S.S. screen) and the magnesium stearate 17 (sieved through a 60 mesh B.S.S. screen) added and mixed thoroughly to produce granules B containing promethazine hydrochloride.

Granules A and B were placed in separate turrets of a suitable tabletting machine so as to produce two-layer tablets each weighing 640 mg. If desired, these tablets can be film coated.

EXAMPLE 17

Capsules were prepared as follows:

(A) Coated tablets were made in the manner described in Example 1 except that only 37.5 mg. of carbamate was used and the total tablet weight was 80 mg.

(B) Coated tablets were made in the manner described in Example 6 except that reduced quantities of lactose and starch resulted in a tablet weight of 90 mg.

(C) 4 tablets from (A) and 1 tablet from (B) were then filled into a No. 1 hard gelatin capsule, which thus contained 150 mg. of 3-methylpent-1-yn-3-ol carbamate and 25 mg. of promethazine hydrochloride.

Having regard to the foregoing disclosure, the following is claimed as the inventive and patentable embodiments thereof:

1. A pharmaceutical composition comprising 3-methylpent-1-yn-3-ol carbamate and promethazine, in a ratio by weight of from 4:1 to 16:1.

2. A pharmaceutical composition as claimed in claim 1 wherein the promethazine is in the form of its hydrochloride.

3. A pharmaceutical composition as claimed in claim 1 wherein the active ingredients are in the form of a two layer tablet.

4. A pharmaceutical composition as claimed in claim 1 wherein at least one ingredient is in the form of coated granules.

5. A pharmaceutical composition as claimed in claim 1 wherein the active ingredients are formulated in a compartmental capsule.

6. A pharmaceutical composition as claimed in claim 1 adapted for oral, rectal and parenteral administration.

7. A method of inducing hypnosis comprising administering simultaneously to an animal a dose of 3-methylpent-1-yn-3-ol carbamate and promethazine the ratio by weight of the dose of the carbamate to the dose of promethazine being from 4:1 to 16:1 and the amount of these doses being effective to induce hypnosis.

8. A method as claimed in claim 7 wherein the promethazine is in the form of its hydrochloride.

References Cited

McGrath et al.: J. of Am. Phar. Assn., vol. XLVII, No. 11, November 1958, pp. 827–830.

Chemical Abstracts 49:517i–518b (1955).

New drugs, 1965, p. 207.

JEROME D. GOLDBERG, Primary Examiner